Max Jellinek
INVENTOR.

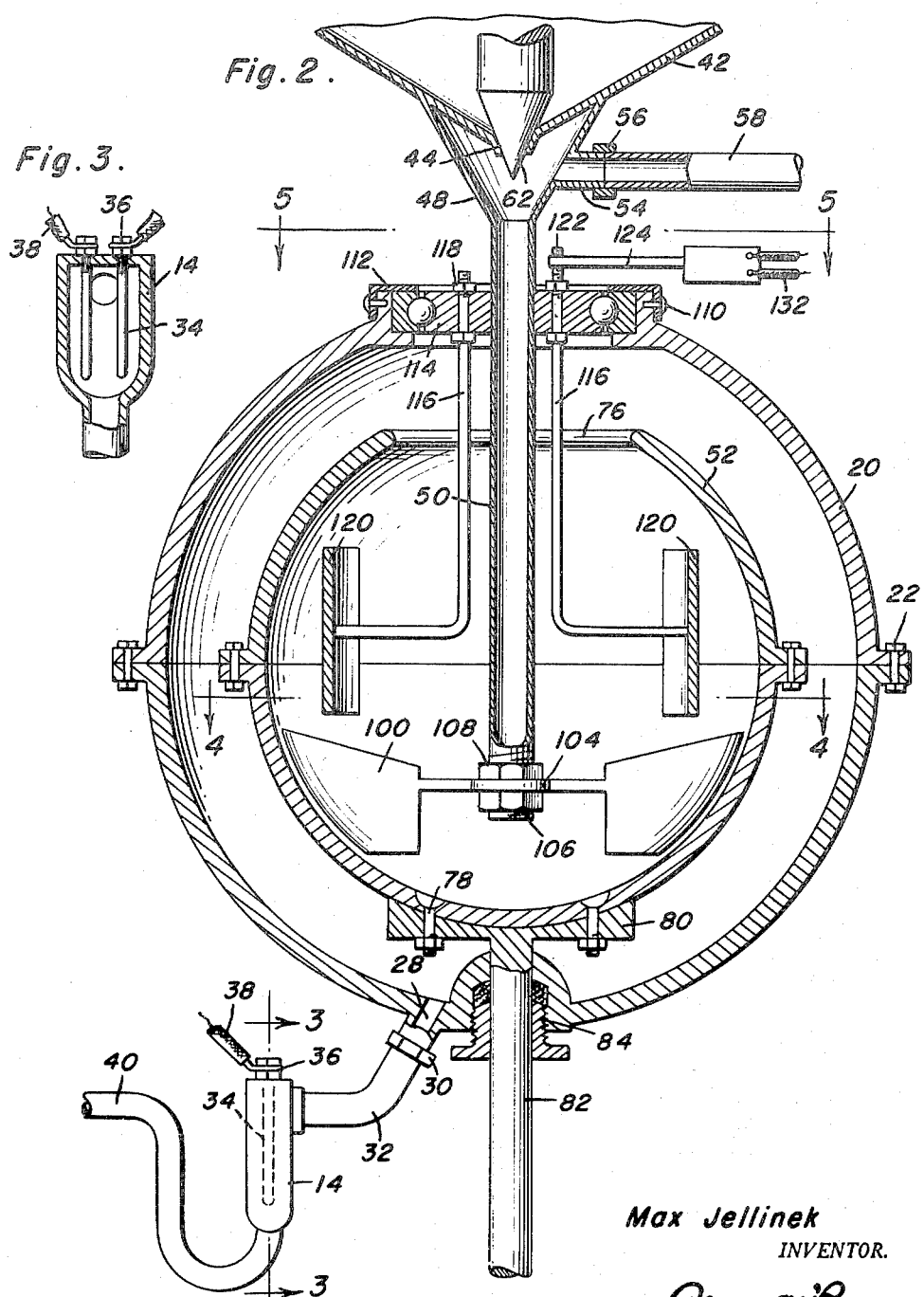

Patented May 30, 1950

2,509,303

UNITED STATES PATENT OFFICE 2,509,303

CONTINUOUS METHOD AND APPARATUS FOR DETERMINING WATER IN NON-ELECTROLYTES

Max Jellinek, Muscatine, Iowa

Application August 24, 1949, Serial No. 112,112

8 Claims. (Cl. 175—183)

This invention relates to a novel continuous method and apparatus for determining the water content of organic non-electrolytic liquids.

The primary object of this invention is to provide a method and apparatus in which an organic non-ionizing liquid containing water may be treated with an ionizing salt to render the same conductive so that the conductivity can be measured on a meter calibrating in percentage water.

Another object of this invention is to provide a method and apparatus of the character described whereby the proof of alcoholic solutions derived from distillation processes may be directly and continuously determined accurately and with a minimum of manipulative skill and effort.

The present invention is based on the principle that the water present in such nonelectrolytic organic liquids, such as alcohol, may be saturated with a suitable inorganic ionizing salt, such as sodium chloride, to render the liquid electrically conductive, the conductivity varying directly with the concentration of water in the liquid. When the conductivity is measured in a suitable calibrated meter, the percentage of water in the liquid may be quickly and easily read on the meter. The meter, in case of alcoholic solutions, may be calibrated directly in proofs. To accurately carry out the process, it is important to continuously and intermittently supply the salt to the alcoholic solution in such a manner that the water in the alcoholic solution becomes saturated so that the subsequent conductivity measurements become directly proportionate to the percentage of water in the sample. The present method and apparatus embodies means for intermittently feeding predetermined amounts of salt, means for agitating the salt and alcoholic liquid, and means for continuously discharging the alcohol-salt solution to an ionizing chamber, the entire process being conducted under a constant temperature, particularly the temperature at which the meter had been calibrated.

The method, therefore, comprises adding sodium chloride to a rotating, centrifuge-like bowl in which is fed an alcohol-water solution, agitating the salt and solution thoroughly, interrupting the supply of salt automatically when a predetermined level thereof is attained in the bowl, discharging the alcohol-water-salt solution into an ionizing chamber having electrodes therein, and connecting the electrodes through an amplifier to a recording instrument for reading alcohol proofs directly, the alcohol-water-salt solution being recycled to the distillation apparatus for subsequent recovery of alcohol. It will be understood to those skilled in the art that the method may be applied to the determination of water in any organic non-electrolytic liquid and that for sodium chloride may be substituted other inorganic ionizing salts.

The method and apparatus will best be understood with reference to the accompanying drawings wherein similar reference characters indicate corresponding elements throughout:

Figure 2 is a fragmentary vertical sectional view through the apparatus;

Figure 3 is a sectional view taken on the line 3—3 of Figure 2;

Figure 1:
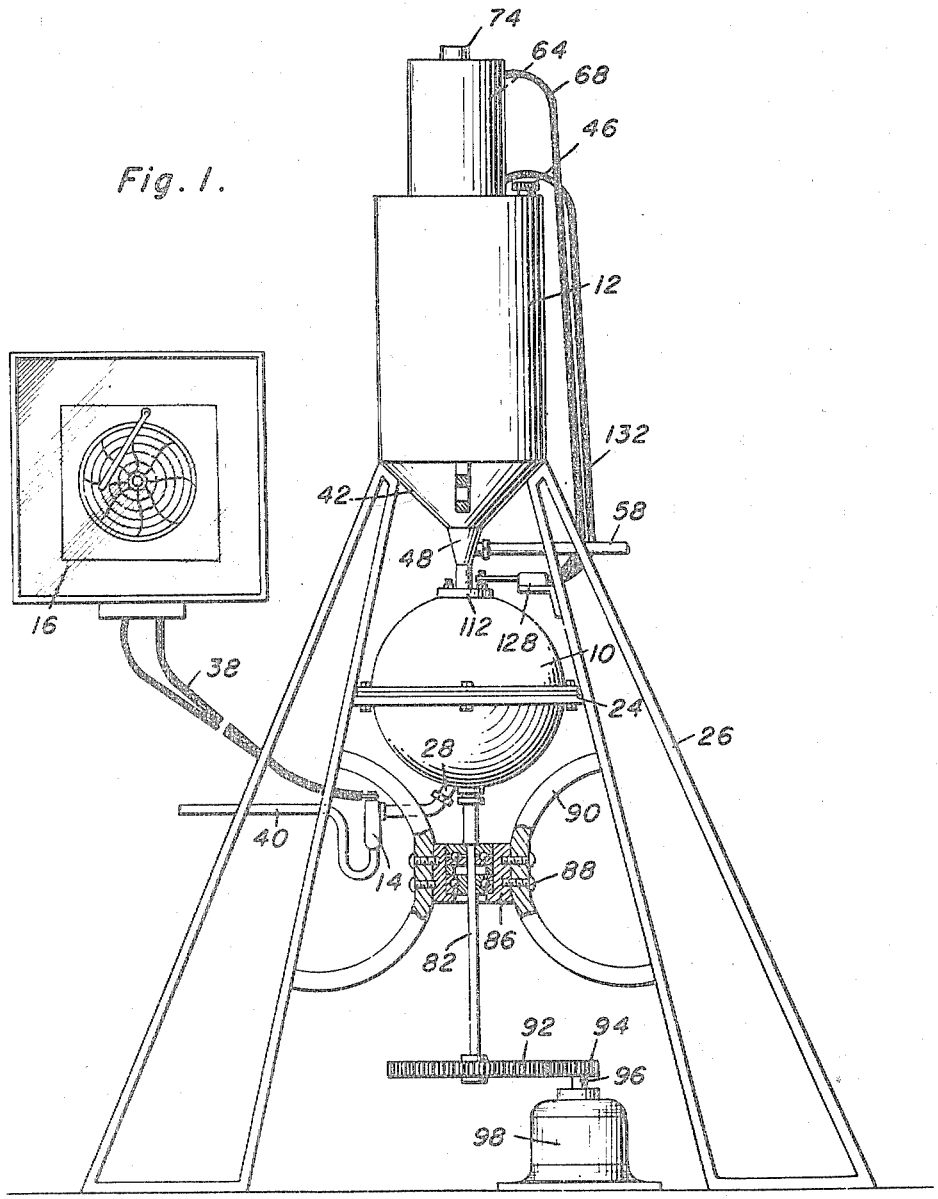
Figure 1 is a side elevational view of the entire apparatus, some parts being shown in section.
Figure 4:
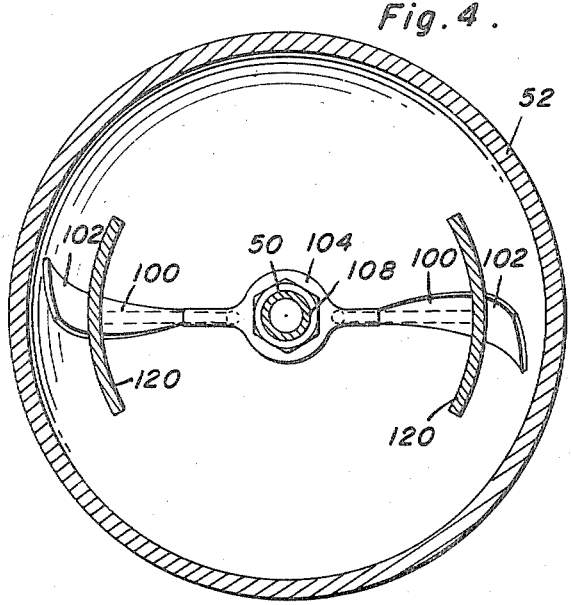
Figure 4 is a sectional view taken on the line 4—4 of Figure 2.
Figure 6:
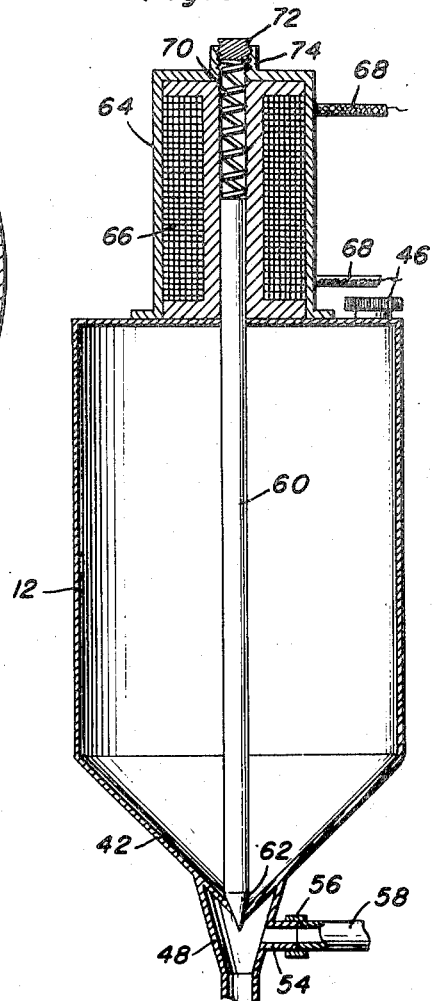
Figure 6 is a sectional view through the salt supply chamber.
Figure 5:
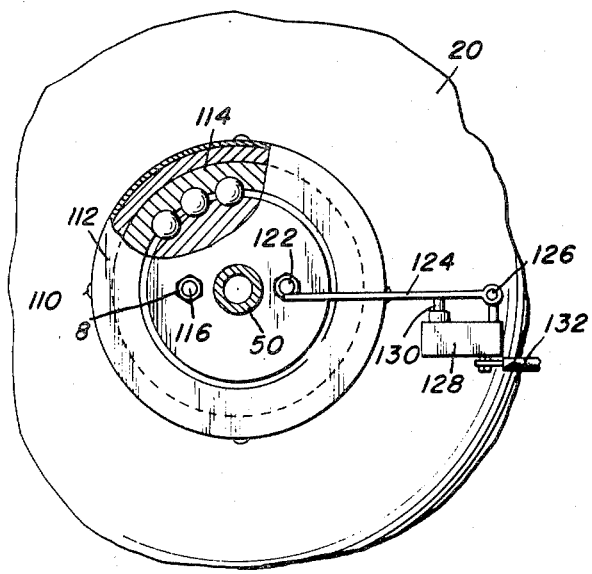
Figure 5 is a sectional view taken on the line 5—5 of Figure 2.

The total assemblage of the present apparatus is shown in Figure 1 and this comprises a centrifuge unit 10, a salt container and dispenser 12, an ionizing chamber or cell 14 and a recording meter 16 operatively connected to the ionizing electrodes in the cell.

The centrifuge unit consists of an outer shell 20 including upper and lower sections with corresponding annular flanges removably bolted together as at 22. The lower annular flange is supported on cross beams 24 welded to upwardly converging support legs 26. At its bottom, the shell is provided with a fluid outlet conduit 28 coupled as at 30 to a pipe 32 connected to the top of the ionizing cell 14. Extending into the cell is a pair of spaced metallic or carbon electrodes 34 to which are connected as at 36 conductive wires 38 leading to the recording meter or instrument 16 which is of conventional construction and which is calibrated either in proofs or percentages of water. Leading from the bottom of the cell 14 is a further conduit 40 which either connects with a storage receptacle or a distillation apparatus (not shown).

Supported upon the upper ends of the legs 26 is a substantially cylindrical chamber 12 having a tapered bottom 42 including a central aperture 44. The top of the chamber has a removable plug 46 for access to the interior thereof for filling the chamber with an ionizing salt. Secured to the tapered bottom wall about the aperture is a funnel 48, the stem 50 of which extends into a bowl 52 disposed concentrically within the shell 20. The funnel includes a branch conduit 54 coupled as at 56 to an organic non-electrolytic solution (or alcohol) inlet pipe 58. Extending through the chamber 12 is an elongated needle valve 60 having a tapered end 62 registerable with the tapered aperture 44. The needle valve is vertically reciprocable in the chamber inasmuch as it extends at its upper end into a housing 64 mounted on the top of the chamber 12, which housing embraces an electromagnet including solenoid coils 66, the valve extending between the coils. Conductive wires 68 are connected to the coils so that when the electromagnet is energized, the needle valve moves upwardly in the chamber to open the aperture 44 and allow salt to fall by gravity through the funnel. The stroke of the needle valve is adjustable by a resilient means which includes a coil spring 70 interposed between the top of the needle valve and a threaded plug 72 received in a threaded nut 74 at the top of the housing.

The needle is upwardly moved to remain until enough salt is fed to the bowl, or vibration supplied to the needle to obtain several strokes during feeding, which will interrupt flow frequently, thus insuring an adequate supply of salt at all times.

The centrifuge unit also includes the bowl 52 which like the other shell is also of two part construction but is open at its top as at 76. At its bottom, the bowl is coupled as at 78 to an arcuate flange 80 secured to the top of a vertical shaft 82 which extends through a bearing 84 removably retained in the bottom of the outer shell 20. The shaft is further journaled in a thrust bearing 86 secured in turn as at 88 to arcuate supports 90 carried by the opposing inner supporting legs 26. The bottom of the shaft carries a gear 92 enmeshing a further gear 94 carried on a drive shaft 96 driven by a motor 98; thus the bowl 52 is rotatable within the outer shell 20.

An agitating means for ensuring complete intermixture of the salt and alcohol is also provided and this consists of diametrically opposed paddles 100 upwardly arcuated at their ends as at 102 and extending virtually to the inner surface of the wall of the bowl. The paddles are interconnected by an apertured hub section 104 which is received on the threaded end 106 of the funnel stem 50, closure nuts 108 being employed to securely attach the hub section to the funnel. The paddles, therefore, are not rotatable with but rather relative to the bowl.

Secured to the top of the outer shell as at 110 is a closure plate 112 which rotatably houses a ball bearing 114. Extending through the bearing and the closure plate is a pair of vertically extending rods 116 retained on the bearing for rotation therewith by means of nuts 118. The rods pass through the opening 76 and into the bowl 52 and at their bottom ends are bent laterally to support arcuate paddles 120 spaced a predetermined distance from the bottom of the bowl. One of the rods 116 includes a lug 122. When the salt in the bowl rises to the height of the paddles 120, the same are caused to rotate and the lug 122 depresses a lever arm 124 pivoted for vertical movement as at 126 to a housing 128 embracing a micro-switch. The housing includes a plunger 130 underlying the lever arm 124 so that a depression of the arm pushes the plunger down to actuate the switch which is operatively connected in turn by conductive wires 132 to the electromagnet 66 to make and break the circuit thereat intermittently. Conductive wires (not shown) lead from a source of electric current to the micro-switch.

In practical operation, the water containing alcohol solution flows continuously through the conduit 58 into the stem 50 and the bowl 52. The micro-switch is so set that the electromagnet is energized so that the needle valve 60 moves upwardly to open the aperture 44 and allow salt to fall through the funnel and into the bowl. The bowl rotates and the paddles 100 agitate the salt and alcohol so that a saturated salt-water solution can be obtained in the bowl. The solid salt and alcohol-salt-water mixture are forced against the inner wall of the bowl and rise thereon until the solid salt strikes the paddles 120 to actuate their rotation whereupon the lug 122 depresses the lever arm 124 to energize the micro-switch and break the circuit to the electromagnet to drop the needle valve, close the aperture 44 and shut off the supply of salt. As the paddles 120 rotate the circuit to the electromagnet opens and closes intermittently to keep a predetermined level of salt in the bowl. In the meantime, the alcohol-water-salt solution has spilled over the bowl through the opening 76 and into the outer shell 20 from which it passes via the conduit 32 through the ionizing chamber 14. A small alternating current having been imposed on the electrodes 34 and calibrated as a zero reading on the meter 16, the salt ions travel to the electrodes to alter the imposed current, the altered current then being amplified to register on the meter, calibrated preferably in percentage water or proof. The extent to which the imposed current is altered is directly proportionate to the concentration of water in the alcohol or organic non-electrolytic solution.

Thus it will be seen that a novel, accurate, and easily operated continuous method and apparatus for quantitatively determining water in non-electrolytes is provided. While a preferred embodiment of the invention has been herein shown and described, it should be distinctly understood that minor variations may be made by those skilled in the art which do not depart from the spirit of the invention and the scope of the appended claims.

Having described the invention, what is claimed as new is:

1. An apparatus for determining the water content of an organic non-electrolytic solution comprising a shell, an ionizing cell having electrodes therein, conduit means interconnecting said cell and said shell, a calibrated meter operatively connected to said electrodes for measuring conductivity, a bowl rotatable within said shell, means for introducing a non-electrolytic solution into said bowl, means for introducing a water soluble electrolytic salt into said bowl, and means for intermittently interrupting the supply of salt in response to a predetermined quantity of salt in said bowl, said non-electrolytic solution and dissolved salt spilling over the bowl and into said shell for passage through said ionizing cell.

2. The combination of claim 1, and means disposed in said bowl for agitating said salt and said non-electrolytic solution.

3. The combination of claim 1, wherein said salt supply means includes a salt-retaining chamber supported above said bowl, said chamber including a bottom wall having an aperture therethrough, a funnel secured to said bottom wall beneath said aperture and extending into said bowl, a needle valve registerable with said aperture and extending through said chamber, electromagnetic means for vertically reciprocating said needle valve, and resilient means for adjusting the strokes of said needle valve.

4. The combination of claim 3, wherein said means for intermittently interrupting said salt supply includes paddles journaled on said shell and extending a predetermined depth into said bowl, said paddles being actuated to rotate after a predetermined quantity of salt collects in said bowl and strikes said paddles, a micro-switch operatively connected to said electromagnetic means, and means for energizing said switch and breaking the circuit to said electromagnetic means in response to a rotation of said paddles.

5. The combination of claim 4, wherein said micro-switch includes a housing therefor and said energizing means includes a lever pivoted for vertical movement on the switch housing, a plunger beneath said lever and vertically reciprocable in said housing to actuate said switch, and a lug carried by one of said paddles for depressing said lever upon rotation of said paddles.

6. The combination of claim 5, wherein said agitating means includes arcuated paddles carried by said funnel beneath said first-mentioned paddles and extending to the inner wall of said bowl adjacent the bottom thereof.

7. A continuous method for determining the water content of an organic non-electrolytic solution comprising continuously feeding the non-electrolytic solution to a rotating bowl, intermittently supplying a water-soluble electrolytic salt to said bowl, agitating said salt and said solution until a saturated solution of the salt is obtained, and conducting said non-electrolytic solution and dissolved salt through an ionizing zone for determining the conductivity of the resultant solution.

8. The method of claim 7, and the step of intermittently interrupting the supply of salt automatically in response to a predetermined level of salt in said bowl.

MAX JELLINEK.

No references cited.